US007728457B2

(12) United States Patent
Carnevale

(10) Patent No.: US 7,728,457 B2
(45) Date of Patent: Jun. 1, 2010

(54) CIRCUIT FOR PROTECTING AGAINST SHORTS IN STARTER MOTOR AND BATTERY CHARGING CABLES

(75) Inventor: Gregory S. Carnevale, Chatham (CA)

(73) Assignee: Navistar Canada, Inc. (CA)

( * ) Notice: Subject to any disclaimer, the term of this patent is extended or adjusted under 35 U.S.C. 154(b) by 73 days.

(21) Appl. No.: 11/872,988

(22) Filed: Oct. 16, 2007

(65) Prior Publication Data

US 2009/0095245 A1 Apr. 16, 2009

(51) Int. Cl.
*H02G 3/00* (2006.01)

(52) U.S. Cl. .................................. 307/10.6; 123/179.3

(58) Field of Classification Search .................... 30/9.1, 30/10.1, 10.6; 123/179.3, 491; 701/113
See application file for complete search history.

(56) References Cited

U.S. PATENT DOCUMENTS

| | | | | |
|---|---|---|---|---|
| 4,842,093 | A * | 6/1989 | Lerche et al. | 180/287 |
| 6,377,031 | B1 * | 4/2002 | Karuppana et al. | 323/220 |
| 6,465,908 | B1 * | 10/2002 | Karuppana et al. | 307/31 |
| 6,800,960 | B2 * | 10/2004 | Koos et al. | 307/10.6 |
| 6,836,094 | B1 * | 12/2004 | Bender | 320/104 |
| 2003/0080621 | A1 | 5/2003 | Kirk | |

* cited by examiner

*Primary Examiner*—Albert W Paladini
(74) *Attorney, Agent, or Firm*—Jeffrey P. Calfa; Mark C. Bach

(57) ABSTRACT

When an ignition switch (22) is operated to other than a start position for cranking an engine (20), a switch (relay 28) places a megafuse (30) in circuit with protecting cables to the electric starter motor (18) and alternator (16) to protect against shorts. When ignition switch (22) is operated to start position for cranking the engine (20), switch (28) removes the megafuse (30) from protecting the cables. If a short blew the megafuse (30) before starting, the ignition switch (22) cannot operate the switch (28) and the engine cannot be cranked.

9 Claims, 3 Drawing Sheets

CIRCUIT FOR PROTECTING AGAINST SHORTS IN STARTER MOTOR AND BATTERY CHARGING CABLES

FIELD OF THE INVENTION

This invention relates generally to electrical systems of motor vehicles. More particularly, the invention relates to a circuit for protecting against a short in a starter motor or a battery charging cable.

BACKGROUND AND SUMMARY OF THE INVENTION

Internal combustion engines that propel motor vehicles are typically electrically started by turning an ignition switch to a start position that causes the engine to be cranked by an electric starter motor. When the engine has started, the switch is released from start position to assume a run position. In start position, electric current flows from a bank of one or more D.C. storage batteries to the electric starter motor that cranks the engine through a set of gears. The amount of current is typically very large, and consequently, heavy electrical cable is typically employed to conduct the current without the presence of any circuit protection device to protect against a short in the cable or the starter motor.

When the cable is routed in a vehicle, attention must be given to the routing path and how the cable is secured to minimize the possibility of a short. Moreover, if a short were to occur in the starter motor itself, even careful routing of the cable would be of no avail.

When the engine is running, an engine-driven alternator generates current for keeping the battery bank charged. To provide some degree of protection against a short, a fusible link may be present in the charging circuit between the alternator and the battery bank. While a fusible link provides some protection against a short between the alternator and battery bank, it does so at the expense of creating additional resistance in the charging circuit from the alternator to the battery. The voltage drop across the fusible link generates wasteful heat and over time may result in less than optimum battery charging that can lead eventually to a weakened battery, a condition that is not desirable, especially in cold weather.

One general aspect of the invention relates to a motor vehicle comprising an engine that is started by cranking and an electrical system that comprises a D.C. voltage source, an electric motor for cranking the engine, and a first switch that is selectively positionable to plural positions, one of which is a start position for cranking the engine.

A second switch is controlled by the first switch. A first input feed, comprising a circuit protection device, connects the D.C. voltage source to a first terminal of the second switch. A second input feed, that is free of any circuit protection device, connects the D.C. voltage source to a second terminal of the second switch. An output feed connects a third terminal of the second switch to an input terminal of a fourth switch that has an output terminal connected to the electric motor.

When the first switch is in any position other than the start position, the second switch connects the first input feed to the output feed, and when the first switch is in the start position, the second switch connects the second input feed to the output feed.

Another general aspect of the invention relates to a motor vehicle comprising an engine that is started by cranking and an electrical system that comprises a bank of one or more storage batteries, an electric motor for cranking the engine, and a first switch that is selectively positionable to plural positions, one of which is a start position for cranking the engine.

A second switch is controlled by the first switch. A first cable connects a terminal of the battery bank and a first input terminal of the second switch and is free of any circuit protection device. A second cable connects to an output terminal of the second switch for carrying current to the electric motor. A circuit protection device is in a current path from the battery bank terminal to a second input terminal of the second switch.

Placement of the first switch in any position other than the start position places the second switch in a first position that connects the second input terminal to the output terminal, and placement of the first switch in the start position places the second switch in a second position that connects the first input terminal to the output terminal.

Still another general aspect of the invention relates to a method for selectively protecting a cable that carries electric current from a bank of one or more storage batteries in a motor vehicle to an electric motor that cranks an engine in the vehicle when a first switch that is positionable to plural positions is positioned to a start position for starting the engine.

The method comprises when the first switch is placed in start position, causing a second switch to be placed in a position through which the second switch connects the cable to a terminal of the battery bank free of any circuit protection device, and when the first switch is placed in any position other than start position, causing the second switch to be placed in a position that connects the cable to the battery terminal through a circuit protection device.

A circuit protection device is understood to be any device that is intended to function by breaking a current path through itself when current through that path exceeds a rated current for which the device is designed.

The foregoing, along with further aspects, features, and advantages of the invention, will be seen in the following disclosure of a presently preferred embodiment of the invention depicting the best mode contemplated at this time for carrying out the invention. The disclosure includes a drawing, briefly described as follows.

DESCRIPTION OF THE PREFERRED EMBODIMENT

Figure 1:
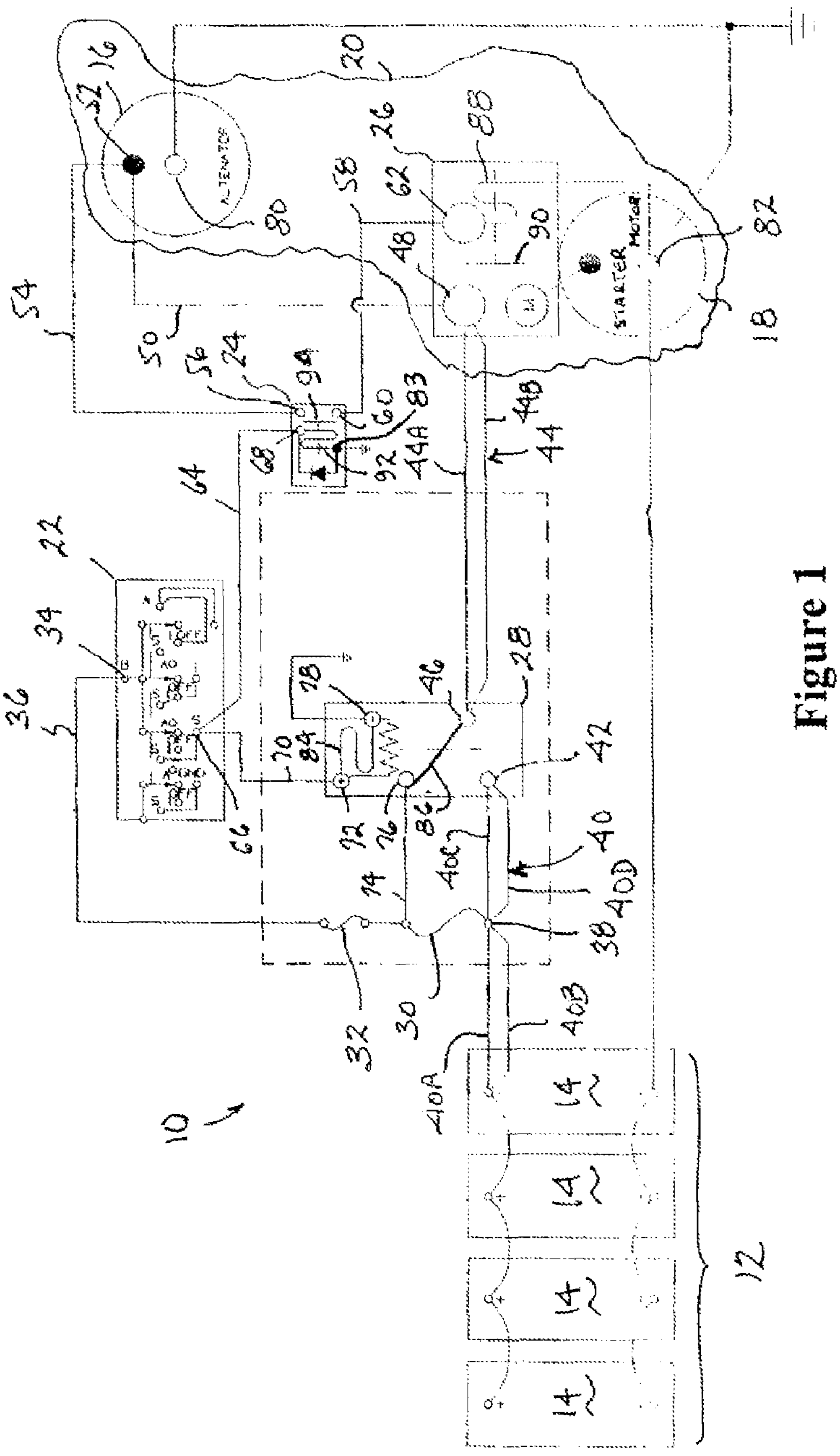
FIG. 1 is a schematic electrical diagram of a first embodiment of circuit embodying principles of the present invention.

FIG. 1 shows a portion of a motor vehicle electrical system 10 that incorporates a circuit embodying principles of the present invention. Electrical system 10 comprises a source of electricity, namely a battery bank 12 having one or more D.C. storage batteries 14, an alternator 16, and an electric starter motor 18. Starter motor 18 is mounted on, and in association with, an internal combustion engine 20 for cranking the engine at starting. When engine 20 runs, a belt drive (not shown) operates alternator 16 to keep batteries 14 charged. FIG. 1 shows a positive voltage electrical system where the negative battery poles are connected together and grounded and where the positive battery poles are connected together.

Running of engine 20 is under the control of a switch 22 that is typically key-operated and commonly referred to as an ignition switch, even in a vehicle whose engine relies on compression of fuel in the engine cylinders for ignition rather than on spark ignition.

The circuit of FIG. 1 further comprises a magnetic starter switch 24 and a starter relay 26 that may be integrated with starter motor 18. Additional elements in the circuit are a relay 28 and two fuses, 30, 32, the former being what is referred to as a megafuse.

Switch 22 can be operated to at least two positions, and often three or four. Positions of the four-position switch shown here are commonly referred to as OFF, ACCESSORY, RUN, and START.

Circuit connections to switch 22 that are relevant to the present invention are shown in FIG. 1. A battery terminal 34 of switch 22 is connected by a wire 36 through fuse 32 and megafuse 30 to a node 38 in a cable 40 that connects the positive battery terminals to one input terminal 42 of relay 28. Cable 40 comprises several individual cable segments. Two parallel cable segments 40A, 40B connect the positive battery terminals and node 38. Two more parallel cable segments 40C, 40D connect node 38 and input terminal 42. The use of two, or even more, parallel cables provides sufficient current-carrying capacity for the electric system load of the particular vehicle. Depending on the particular load of any particular vehicle, a single cable of proper gauge may be adequate.

A cable 44 that comprises parallel cable segments 44A, 44B connects an output terminal 46 of relay 28 and a terminal 48 of relay 26. A cable 50 connects a positive polarity output terminal 52 of alternator 16 and terminal 48. A wire 54 connects terminal 52 and a terminal 56 of switch 24. Another wire 58 connects a terminal 60 of switch 24 and a terminal 62 of relay 26. Another wire 64 connects a start terminal 66 of switch 22 and a terminal 68 of relay 24.

A wire 70 connects terminal 66 and a terminal 72 of relay 28, and a cable 74 connects the junction of fuse 32 and megafuse 30 to a second input terminal 76 of relay 28. A terminal 78 of relay 28 is grounded, as are ground terminals 80 of alternator 16 and 82 of starter motor 18. A terminal 83 of relay 24 also is grounded.

Relay 28 comprises a coil 84 that operates a contact 86, relay 26 comprises a coil 88 that operates a contact 90, and relay 24 comprises a coil 92 that operates a contact 94.

The circuit operates in the following way. When switch 22 is in any position other than the start position, the current path from megafuse 30 through relay 28 to starter motor 18, alternator 16, and relay 24 is protected against shorts. In other words, as long as switch 22 is not cranking motor 18, a short in cable 74, cable 44, cable 50, or wire 54 will blow megafuse 30. Certain shorts in relay 28, starter motor 18, alternator 52, and relay 24 will also trip the megafuse.

In the absence of any shorts, operation of switch 22 to start position will enable engine 20 to be cranked. In start position, switch 22 energizes coil 84 to operate contact 86 to connect output terminal 46 to input terminal 42 instead of input terminal 76. In start position, switch 22 also energizes coil 92 to operate contact 94 to connect output terminal 60 to terminal 62 of relay 26, causing coil 88 to become energized and operate contact 90 to connect starter motor 18 to terminal 46. This operation of relays 28 and 26 causes starter motor 18 to be connected through cable 44, contact 86, and cable 40 to the positive terminal of the battery bank and removes megafuse 30 from the current path to the starter motor. The only resistance present in the current path is that of the cables and contacts in relays 28 and 26. The two relays are rated for handling the current flow.

Figure 2:
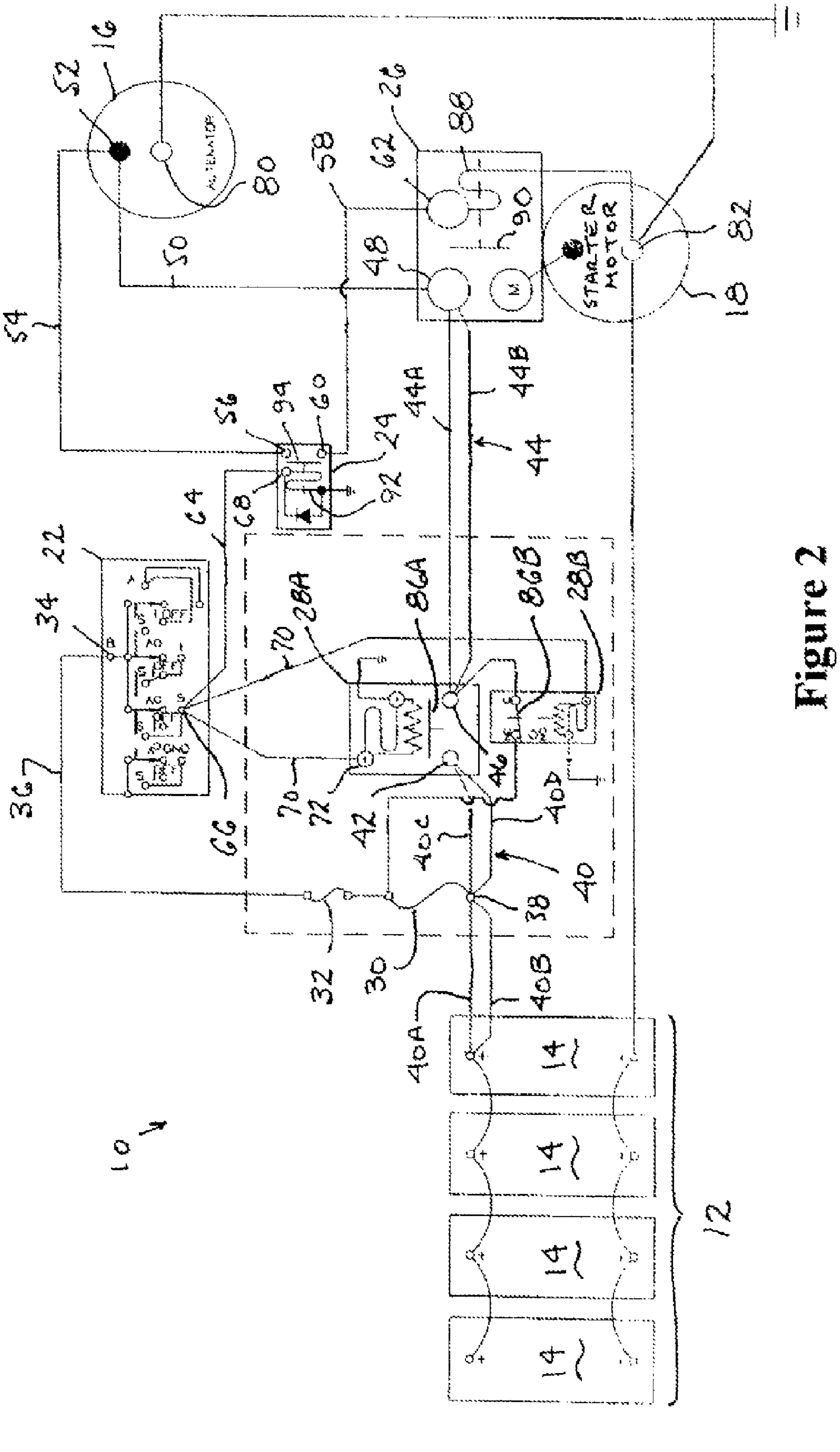
FIG. 2 is a schematic electrical diagram of a second embodiment of circuit embodying principles of the present invention.

FIG. 2 shows a circuit in which components corresponding to components in FIG. 1 are marked by the same reference numerals. FIG. 2 differs from FIG. 1 in that two relays 28A and 28B replace the single relay 28. The combination of the two relays 28A, 28B is functionally equivalent to the single relay 28, allowing each embodiment to be generally considered as a switch.

Relay 28A has a normally open contact 86A, and relay 28B, a normally closed contact 86B. When switch 22 is in any position other than the start position, megafuse 30 provides protection through contact 86B. When switch 22 is in the start position, contact 86A closes to create a current path to starter motor 18 for cranking engine 20, and contact 86B opens to remove megafuse 30 from protecting the circuitry connected to the output of relay 86.

Figure 3:
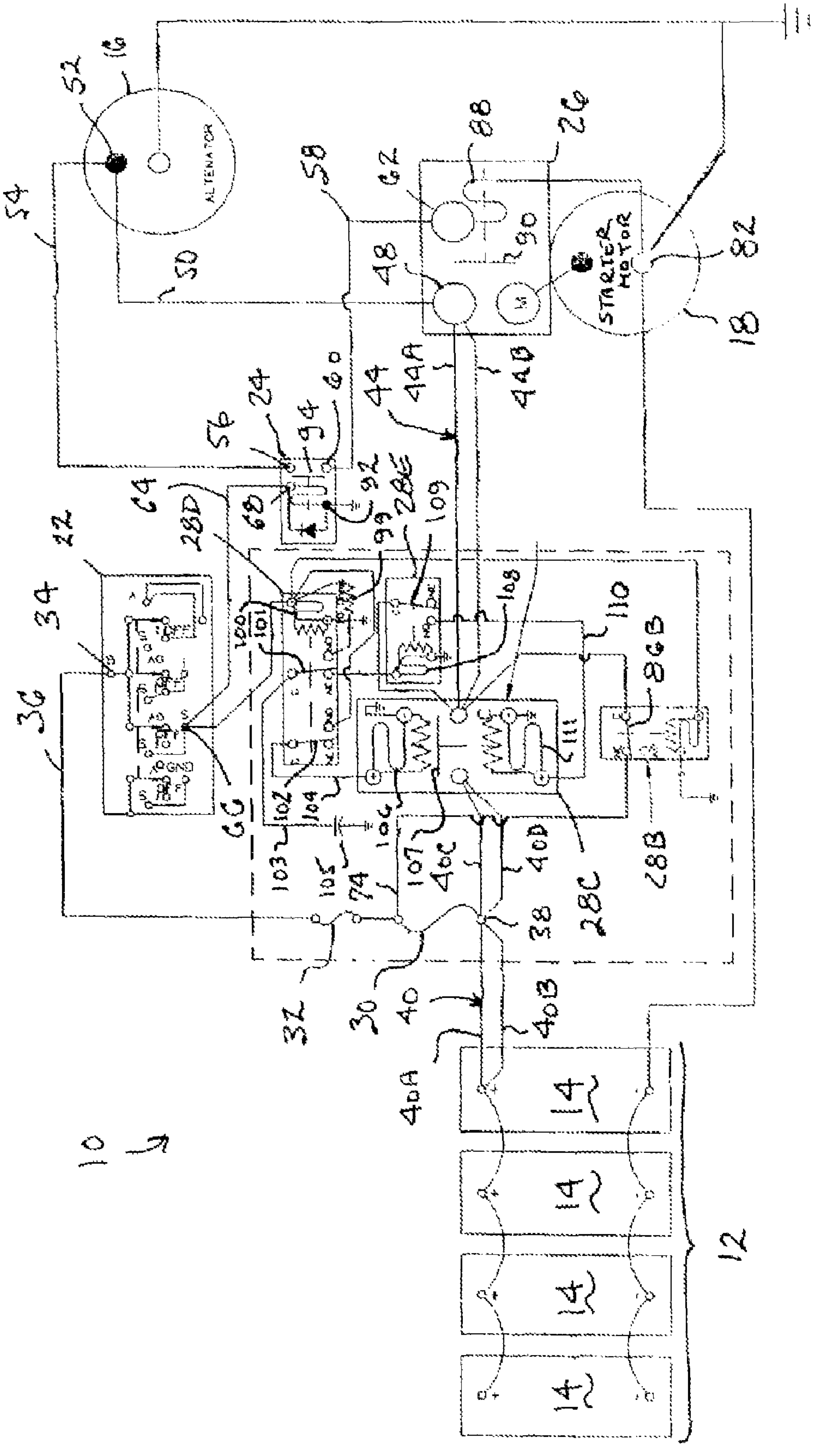
FIG. 3 is a schematic electrical diagram of a third embodiment of circuit embodying principles of the present invention.

FIG. 3 shows a circuit in which components corresponding to components in FIG. 2 are marked by the same reference numerals. FIG. 3 differs from FIG. 2 in that relay 28A is replaced by a mechanical latching relay 28C and two additional relays 28D, 28E. When switch 22 is in any position other than the start position, megafuse 30 provides protection through contact 86B.

When switch 22 is in the start position, a contact 101 of relay 28D closes to provide a path for current from switch 22 through a resistor 99 to a circuit 103 that charges a capacitor 105. In a very short time capacitor 105 fully charges and current stops flowing in that path. Also when switch 22 is placed in the start position, a second contact 102 closes to provide a path from switch 22 through relay 28D to a circuit 104 that activates a latch coil 106 of latching relay 28C, causing a contact 107 to be latched closed.

Closing of contact 107 creates a path for current from battery bank 12 through cable 40, contact 107 and cable 44 to terminal 48 of starter relay 26, and because placement of switch 22 in the start position also delivers battery voltage to terminal 62 of relay 26, as in the prior two embodiments, contact 90 is closed to complete the circuit from contact 48 to starter motor 18, thus cranking engine 20. When switch 22 is returned from start position to any other position, operation of starter motor 18 ceases. This occurs in the following way.

When coil 100 is de-energized, contact 101 returns to the position that disconnects capacitor 105 from the battery bank. Capacitor 105 promptly discharges via circuit 103 and contact 101 through a coil 108 of relay 28E. Capacitor discharge current flows in sufficient amount for sufficient time to activate coil 108 long enough to connect a contact 109 of relay 28E to a circuit 110 leading to an unlatch coil 111 of relay 28C such that relay 28C unlatches to break the current path from the battery bank to starter relay terminal 48.

While a presently preferred embodiment of the invention has been illustrated and described, it should be appreciated that principles of the invention are applicable to all embodiments that fall within the scope of the following claims.

What is claimed is:

1. A motor vehicle comprising:

an engine that is started by cranking; and an electrical system that comprises a D.C. voltage source, an electric motor for cranking the engine, a first switch that is selectively positionable to plural positions, one of which is a start position for cranking the engine, a second switch that is controlled by the first switch, a first input feed, comprising a circuit protection device, from the D.C. voltage source to a first terminal of the second switch, a second input feed, that is free of any circuit protection device, from the D.C. voltage source to a second terminal of the second switch, an output feed from a third terminal of the second switch to an input terminal of a fourth switch that has an output terminal connected to the electric motor, wherein when the first switch is in any position other than the start position, the second switch connects the first input feed to the output feed, and when the first switch is in the start position, the second switch connects the second input feed to the output feed.

2. A motor vehicle as set forth in claim 1 in which the fourth switch comprises a relay having a normally open contact that becomes closed when the first switch is placed in start position.

3. A motor vehicle as set forth in claim 1 in which the D.C. voltage source comprises a battery bank having one or more D.C. storage batteries.

4. A motor vehicle as set forth in claim 1 further comprising an alternator that is driven by the engine for keeping batteries in the battery bank charged by delivering charge current through a charge circuit between an output terminal of the alternator and the third terminal of the second switch.

5. A motor vehicle as set forth in claim 1 wherein the charge circuit between an output terminal of the alternator and the third terminal of the second switch includes the output feed from the third terminal of the second switch to the input terminal of the fourth switch.

6. A motor vehicle as set forth in claim 4 in which the circuit protection device comprises a fuse having a current rating large enough to handle the maximum electrical load that the electrical system can impose on the D.C. voltage source with the engine running after having been started.

7. A motor vehicle as set forth in claim 6 in which the second feed comprises plural cable segments running in succession from the D.C. voltage source to the second switch, and first feed includes a cable segment of the second feed that is between the fuse and the D.C. voltage source.

8. A motor vehicle as set forth in claim 1 in which the second switch comprises a relay having a coil that is selectively energized and de-energized by the first switch and a contact that is operated by the coil to connect the output feed to the second input feed when the first switch is in the start position and to connect the output feed to the first input feed when the first switch is in other than the start position.

9. A motor vehicle as set forth in claim 1 in which the second switch comprises a first relay having a coil that is selectively energized and de-energized by the first switch and a contact that is operated by the coil to connect the output feed to the second input feed when the first switch is in the start position but not when the first switch is in a position other than the start position and a second relay having a coil that is selectively energized and de-energized by the first switch and a contact that is operated by the second relay's coil to connect the output feed to the first input feed when the first switch is in any position other than the start position but not when the first switch is in the start position.

* * * * *